July 27, 1965  E. L. SCHEIDENHELM  3,197,022
CONVEYOR
Filed July 26, 1963  4 Sheets-Sheet 1
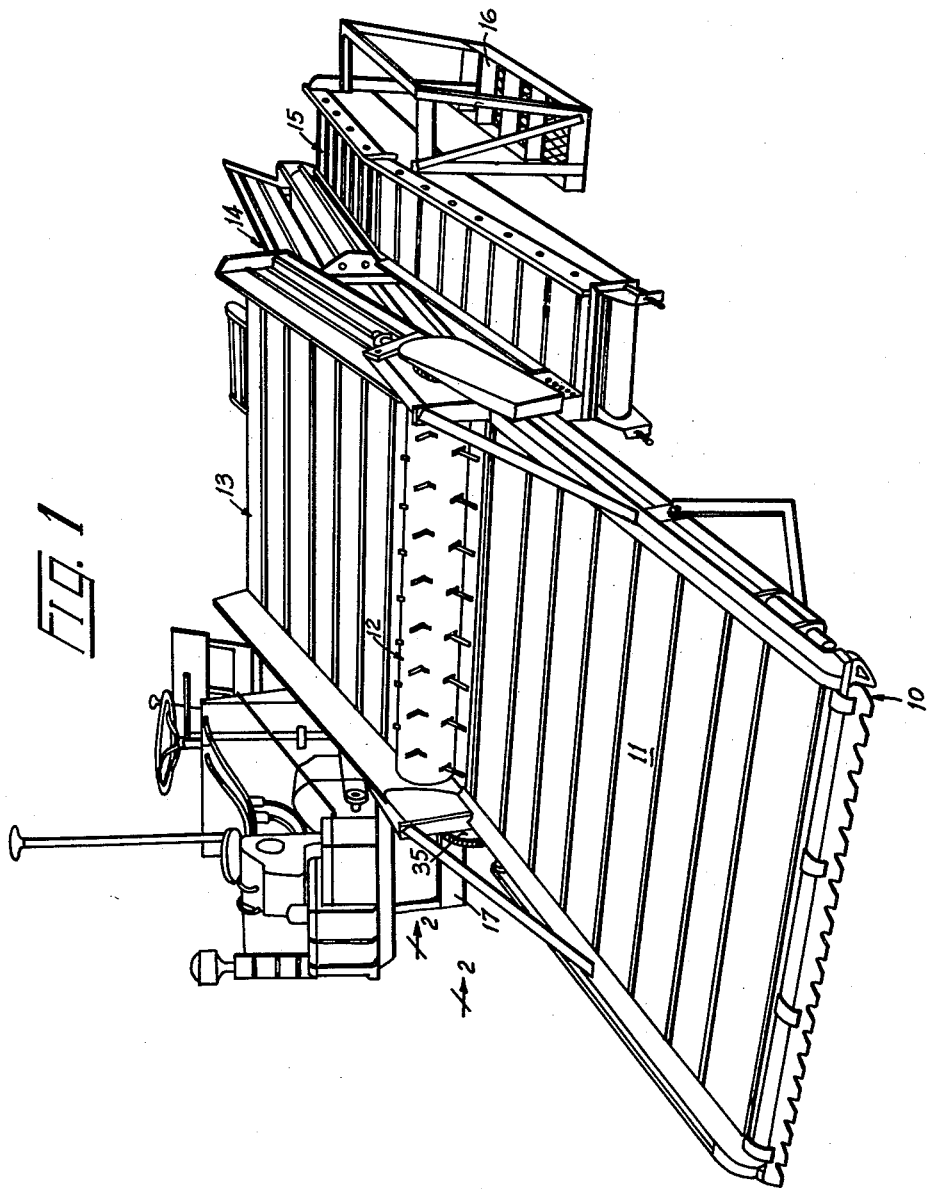
INVENTOR.
EARL L. SCHEIDENHELM
BY Wells & St. John
ATTYS.

July 27, 1965  E. L. SCHEIDENHELM  3,197,022
CONVEYOR
Filed July 26, 1963  4 Sheets-Sheet 2
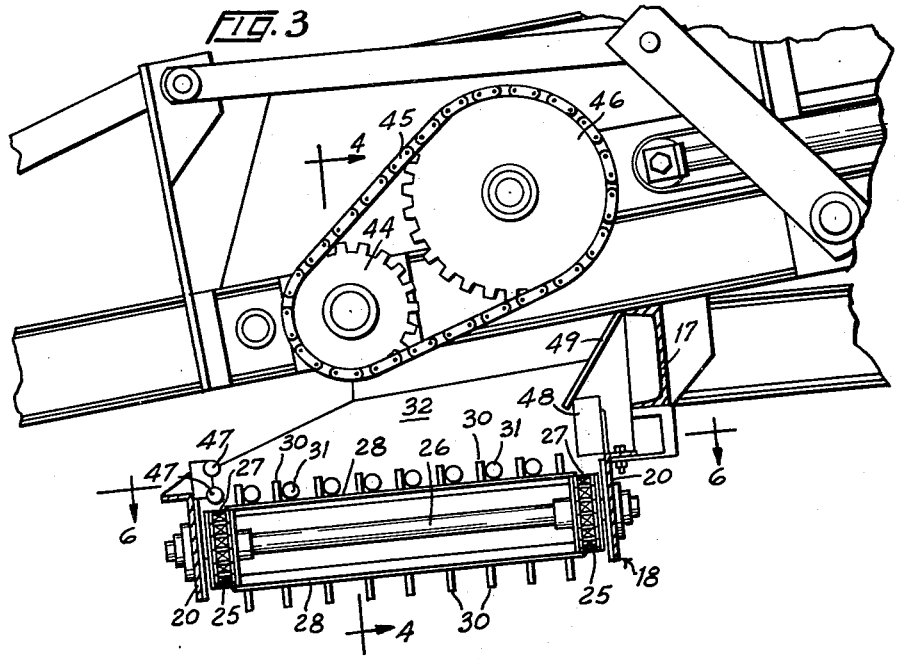
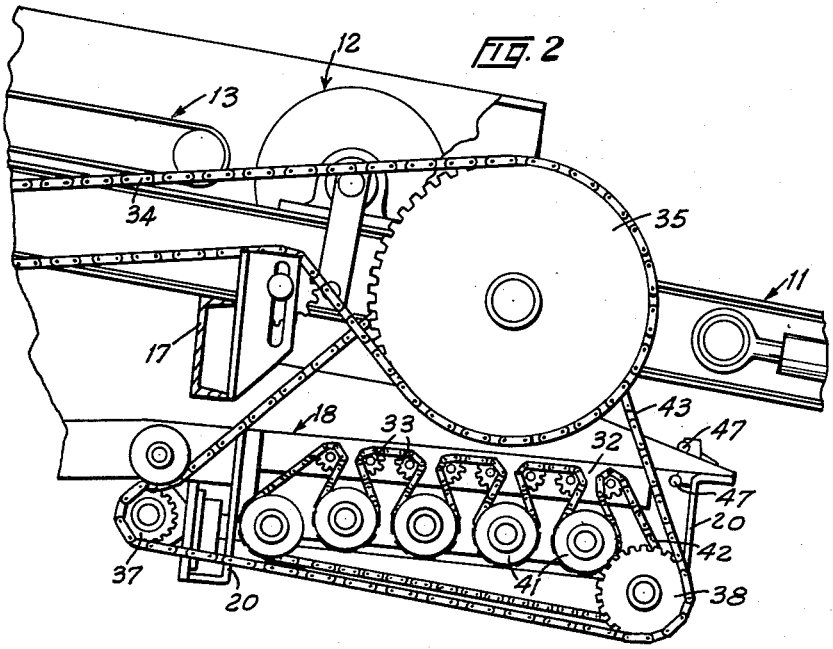
INVENTOR.
EARL L. SCHEIDENHELM
BY Wells & St. John
ATTYS.

July 27, 1965   E. L. SCHEIDENHELM   3,197,022
CONVEYOR
Filed July 26, 1963   4 Sheets-Sheet 3
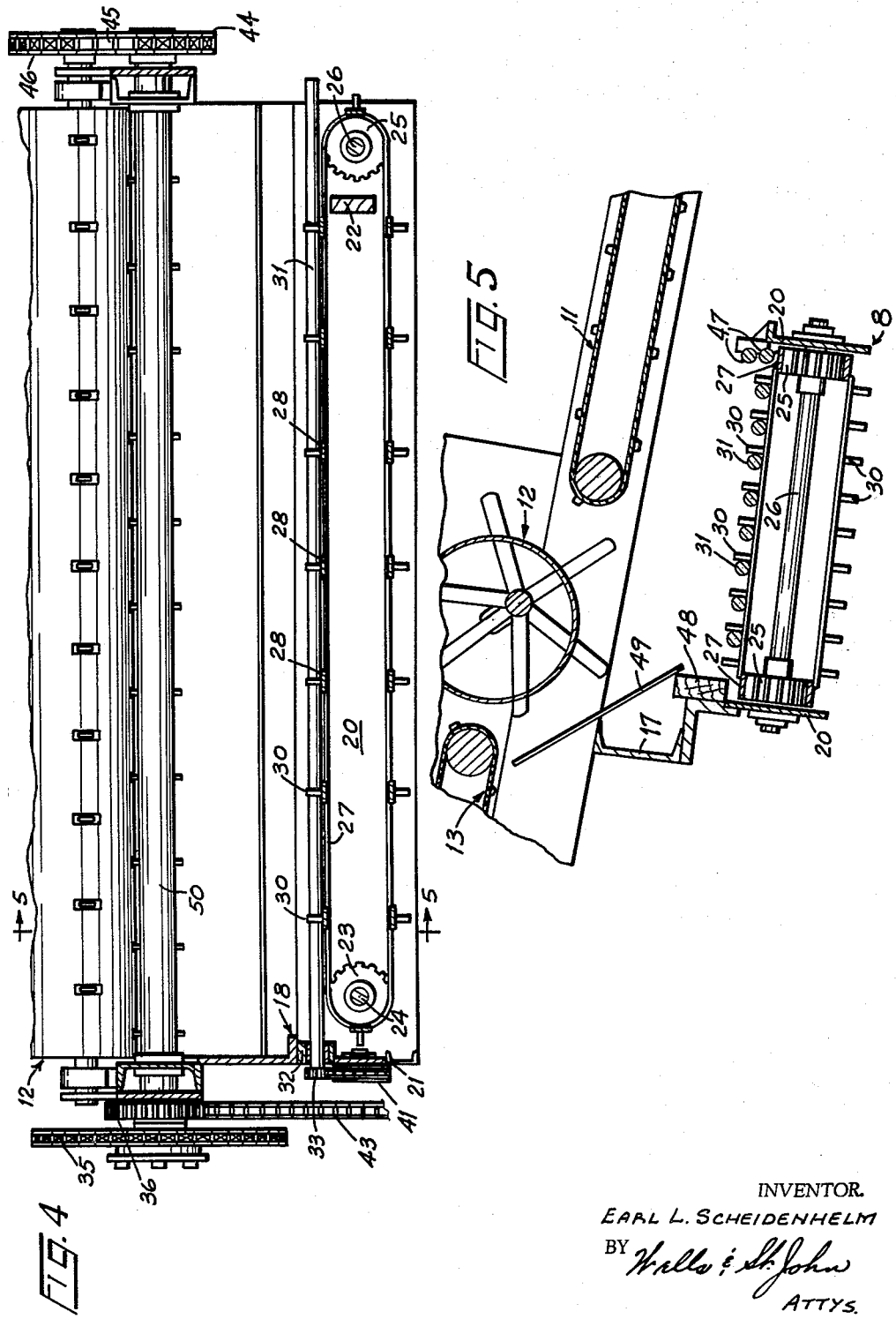
INVENTOR.
EARL L. SCHEIDENHELM
BY Wallo & St. John
ATTYS.

July 27, 1965 E. L. SCHEIDENHELM 3,197,022
CONVEYOR
Filed July 26, 1963 4 Sheets-Sheet 4
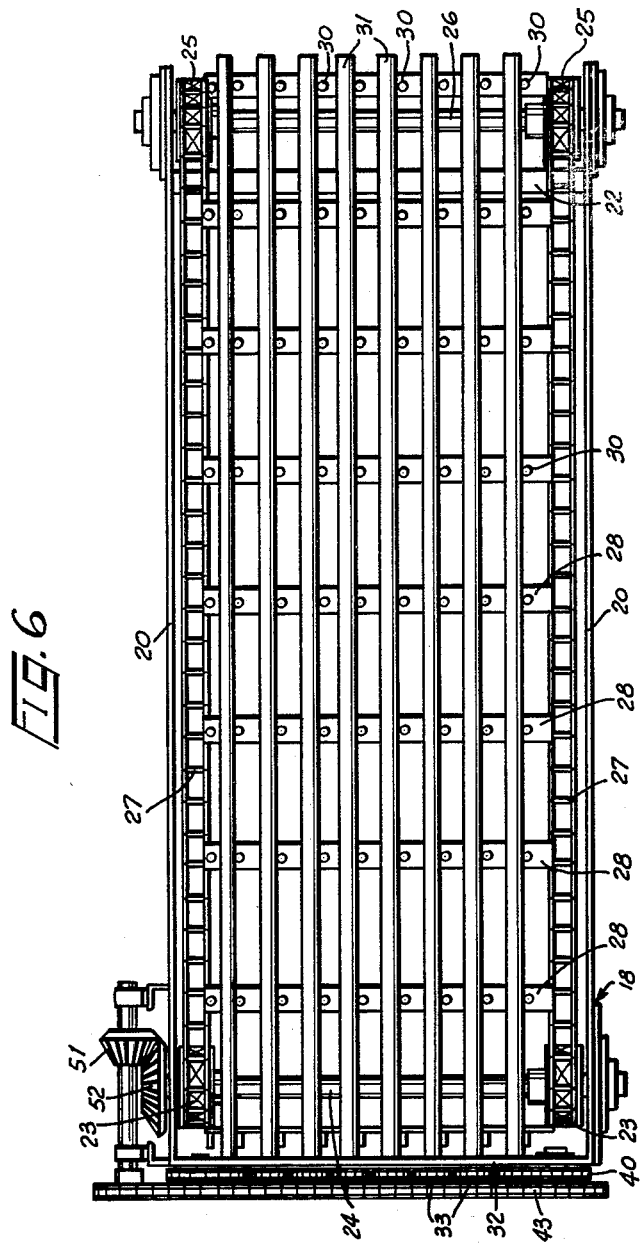
INVENTOR.
EARL L. SCHEIDENHELM
BY
ATTYS.

United States Patent Office 3,197,022
Patented July 27, 1965

3,197,022
CONVEYOR
Earl L. Scheidenhelm, Mendota, Ill., assignor, by mesne assignments, to Hart-Carter Company, Chicago, Ill., a corporation of Delaware
Filed July 26, 1963, Ser. No. 297,750
6 Claims. (Cl. 198—195)

This invention relates to a novel conveyor assembly, particularly one designed to effect the separation of desired crops from rock and dirt particles.

The present invention introduces a conveyor designed for harvesting or crop handling implements wherein the crop is accompanied by dirt in the form of clods and dust, and also by small rocks or pebbles. The present invention is designed to carry the crop where desired, but to allow dirt and rock to fall through the conveyor so as to be discharged upon the ground surface.

It is a first object of this invention to provide a conveyor which will provide positive motion to larger articles such as a tomato crop, but which will allow smaller articles and dirt to fall through the conveyor.

Another object of this invention is to provide such a device which is self-cleaning with a motion that will actually urge the dirt and rocks to fall through the conveyor, while preventing such motion of the desired crop.

Another object of this invention is to provide a novel conveyor assembly wherein the lower flight of the conveyor is relatively open so as to provide unobstructed free fall of the dirt particles once they have passed through the conveyor upper flight.

These and further objects will be evident from a study of the following disclosure, taken in conjunction with the accompanying drawings which illustrate a preferred form of the device. It is to be understood that the particular installation and form of the invention shown in the drawings is merely by way of example and that the invention itself is not to be restricted to these particular structures.

In the drawings:

FIGURE 1 is a perspective view of a tomato harvester embodying the present invention;

FIGURE 2 is an end view of the instant conveyor assembly taken from the side indicated by the arrows 2—2 in FIGURE 1;

FIGURE 3 is an end view of the conveyor taken from the end opposite to that seen in FIGURE 2;

FIGURE 4 is a vertical longitudinal sectional view of the conveyor assembly as seen along line 4—4 in FIGURE 3;

FIGURE 5 is a transverse sectional view of the conveyor assembly as seen along line 5—5 in FIGURE 4; and FIGURE 6 is a top plan view of the conveyor alone as seen generally along line 6—6 in FIGURE 3.

Referring now to the drawings, and particularly to FIGURE 1, the instant conveyor is designed particularly for a tomato harvester, although it could be used on many various types of harvesting or crop handling equipment where soil and rocks must be separated from larger sized crops. The harvester is merely shown in a general view and includes a lower cutter bar 10 which operates at or below ground level. Crop cut by the bar 10 is elevated on a draper 11 and deposited upon a pickup 12 which has retractable fingers to carry the vines and crop over pickup 12 and deposit them upon an upper draper 13. The upper draper 13 carries the vines and crop to its upper end, where it drops them upon a separating mechanism shown generally by the numeral 14, such as the vibrating separator disclosed in my prior Patent No. 3,071,196. In this tomato harvester, the separated tomatoes are deposited upon a delivery conveyor (not shown) to the left as seen in FIGURE 1 where they are boxed by manual operations.

The improvement herein lies in a conveyor positioned directly under the pickup 12, which allows dirt and rocks to fall to the ground from the space between the upper end of the elevating draper 11 and pickup 12, and yet will carry any tomatoes which drop in this area to a delivery conveyor 15, the good tomatoes being manually recovered by persons on platform 16, who can place them on the separating mechanism 14. This conveyor mechanism is specifically illustrated in FIGURES 2 through 6. The details of the drapers 11 and 13 and the pickup 12, as well as the remainder of the harvester, are not contained herein since they are merely exemplary of the environment within which the conveyor might be utilized.

The harvester shown in the drawings has a main cross channel 17 which carries the draper machinery at the forward end thereof and upon which the instant conveyor is suspended. The conveyor frame 18 is rectangular in shape and extends transversely across the width of the pickup 12 and elevating draper 11. The frame 18 includes longitudinal sides 20 and an end plate 21 which is located to the left of the machine as viewed in FIGURE 1. The right hand end of the sides 20 are joined by a brace 22 to complete a rigid rectangular frame. The frame is mounted in a lateral position and is inclined slightly in a downwardly and forwardly facing direction. The conveyor might assume any desired position near the horizontal.

Mounted between the sides 20 of the frame 18 are two laterally spaced driven sprockets 23 fixed to a shaft 24. At the right hand end of the frame 18 are two similar idler sprockets 25 fixed to a shaft 26. The respective sprockets 23 and 25 at each side of the frame 18 are spanned by endless chains 27 which provide upper and lower flights in a conventional manner.

Fixed across the chains 27 are longitudinally spaced bars 28 that extend perpendicularly to the chains 27. The bars 28 are widely spaced and are the actual conveyor elements involved in this invention. Each bar 28 is provided with a similarly aligned row of lugs 30 which are transversely spaced from one another along the bars 28, as can be seen in FIGURES 3, 5 and 6.

Resting upon the upper surfaces of the bars 28 long the upper flights of chains 27 are a plurality of transversely spaced longitudinal rods 31. The rods 31 are mounted upon the frame 18 by means of a mounting plate 32 directly above the end plate 21. Each of the rods 31 has a rod sprocket 33 fixed thereto on the outside surface of the plate 32. Lugs 31 are rotatably mounted in the mounting plate 32 for rotation about their respective longitudinal axes. Preferably, one rod 31 is mounted between each pair of lugs 30 on the bars 28. Each rod is rather long relative to its diameter and rests freely against the row of lugs 30 and upon the supporting bars 28.

At the left hand end of the conveyor, as can be seen in FIGURE 2, there is provided a mechanism for driving both the sprockets 23 and the rods 31. Power is supplied from the engine of the harvesting apparatus (not shown) through a drive chain 34 which turns a large sprocket 35 fixed to the upper shaft 50 of the elevating draper 11. Also fixed to the shaft 50 is a smaller sprocket 36 (FIGURE 4) which powers a chain 43 entrained about a sprocket 37 and a second sprocket 38. The sprocket 37 drives the sprocket 23 for the chains 27 through bevel gears 51–52 along the rear left hand end of the frame 18. The sprocket 38 drives a smaller sprocket 40 directly behind it which turns a chain 42 that is wrapped about the rod sprockets 33 and idler sprockets 41 in such a fashion as to turn each of the rods 31 in the same direction. The rods 31 might be turned in opposite directions or might remain stationary by eliminating the drive connections entirely when so desired.

The remainder of the driving mechanisms involved in connection with this invention are shown in FIGURE 3. The shaft 50 has a driving sprocket 44 at its remaining end which operates a chain 45 entrained about a larger sprocket 46 that operates pickup 12. Thus the same driving mechanism is used for pickup 12, draper 11, chains 27 and rods 31.

Along the front or lower side of the conveyor are side rods 47 merely fixed to the lower side 20 to prevent larger articles from falling over the side of the conveyor. At the upper end is a transverse rail 48 for this same purpose, and a deflector 49 to insure proper placement of falling particles upon the rods 31.

In operation, tomatoes, vines and dirt are fed upwardly on the draper 11 to the fingers of the pickup 12. The gap that exists between the main body of the pickup 12 and the upper end of draper 11 allows small rocks, loose tomatoes, and soil to fall upon the rods 31, while vines and attached tomatoes are carried over the pickup 12 to the draper 13. The rods 31 are spaced so as to prevent tomatoes from falling between them, while the dirt and smaller rocks are capable of falling downwardly, and their fall is unobstructed by the rather wide spacing of the bars 28 along the lower flights of chains 27. The lugs 30 which protrude slightly above rods 31, carry the tomatoes in a rolling action and deposit them upon the delivery conveyor 15. Dirt and mud is not allowed to collect on the rods 31 which rotate so as to break up clods, and which are wiped clean during their rotation by rubbing against the lugs 30 and bars 28. Thus the conveyor is self-cleaning, while providing positive movement of tomatoes across its upper surface.

Various modifications might be made in the structure of this conveyor without deviating from the basic purposes and details set out above. For this reason, only the following claims are intended to limit the scope of the invention.

Having thus described my invention, I claim:

1. A conveyor comprising:
    a rigid rectangular framework;
    a pair of identical endless chains mounted on coaxial pairs of sprockets located respectively at each side and at each longitudinal end of said framework, the chains being extended in aligned upper and lower longitudinal flights;
    a plurality of bars fixed across said chains in longitudinally spaced position oriented perpendicularly relative to said chains;
    a plurality of spaced parallel rods mounted in longitudinal positions on said framework directly adjacent the upper surface of said bars along the upper chain flights;
    article engaging means mounted on the individual bars, said article engaging means protruding outwardly from said bars beyond said rods along the upper longitudinal flights of said chains;
    and drive means operatively connected to said sprockets to drive said chains in unison.

2. A conveyor comprising:
    a rigid supporting framework;
    a pair of identical endless chains mounted on sprockets located respectively at each side of said framework and extending longitudinally relative thereto in upper and lower flights located in parallel positions relative to one another;
    a plurality of transverse bars having the two ends thereof fixed respectively to said chains, the bars being longitudinally spaced from one another along the lengths of the chains;
    a plurality of longitudinal rods mounted on said framework resting upon the upper surfaces of said bars along the upper flight of said chains, said rods being longitudinally spaced from one another;
    article engaging means mounted on the individual bars, said article engaging means protruding outwardly from said bars beyond said rods along the upper longitudinal flights of said chains.

3. A conveyor as defined in claim 2 wherein said article engaging means comprises:
    a plurality of lugs fixed to each of said bars and extending outwardly therefrom, said lugs being interspersed between said rods and the lugs of each bar being longitudinally aligned with those of the remaining bars.

4. A conveyor as defined in claim 2 further comprising:
    drive means on said framework operatively connected to said rods to rotate each rod about its central longitudinal axis.

5. A conveyor comprising:
    a rigid rectangular framework having an open central portion;
    a pair of identical endless chain assemblies mounted along the sides of the framework in corresponding upper and lower longitudinal flights;
    a plurality of transverse bars fixed to said chains in longitudinally spaced positions spanning the open central portions of said framework;
    a plurality of laterally spaced longitudinal rods mounted on said framework at one end thereof and resting freely upon the bars of the upper chain flights;
    article engaging means mounted on the individual bars, said article engaging means protruding outwardly from said bars beyond said rods along the upper longitudinal flights of said chains;
    and drive means operatively connected to said chains to move said chains in unison.

6. A conveyor as defined in claim 5 further comprising:
    means on said framework operatively connected to said rods to rotate said rods about their individual central longitudinal axes.

References Cited by the Examiner
UNITED STATES PATENTS

| | | | |
|---|---|---|---|
| 2,086,878 | 7/37 | Paxton | 198—174 |
| 2,778,474 | 1/57 | Koning | 198—105 |

SAMUEL F. COLEMAN, *Primary Examiner.*

WILLIAM B. LA BORDE, *Examiner.*